«12» United States Patent
Panidis et al.

«10» Patent No.: US 9,716,611 B1
«45» Date of Patent: Jul. 25, 2017

«54» METHOD AND APPARATUS FOR ENHANCING LINK ANOMALY TOLERANCE IN A SCSI SYSTEM

«71» Applicant: EMC Corporation, Hopkinton, MA (US)

«72» Inventors: Anestis Panidis, Saratoga, CA (US); Arieh Don, Newton, MA (US); Subin George, Framingham, MA (US)

«73» Assignee: EMC IP Holding Company LLC, Hopkinton, MA (US)

«*» Notice: Subject to any disclaimer, the term of this patent is extended or adjusted under 35 U.S.C. 154(b) by 811 days.

«21» Appl. No.: 13/904,368

«22» Filed: May 29, 2013

«51» Int. Cl.
H04L 12/703 (2013.01)
H04L 12/24 (2006.01)

«52» U.S. Cl.
CPC .............. H04L 41/00 (2013.01); H04L 41/06 (2013.01)

«58» Field of Classification Search
None
See application file for complete search history.

«56» References Cited

U.S. PATENT DOCUMENTS

| 6,574,755 B1* | 6/2003 | Seon ................... G06F 11/1402 710/108 |
| 8,020,031 B1* | 9/2011 | Govande ............. G06F 11/0781 714/2 |
| 8,135,918 B1* | 3/2012 | Yueh ....................... G06F 13/28 711/147 |
| 8,799,608 B1* | 8/2014 | Raizen .................... G06F 3/061 711/168 |
| 2007/0263649 A1 | 11/2007 | Cuni et al. |
| 2009/0210561 A1* | 8/2009 | Ricci ..................... G06F 13/122 710/5 |
| 2010/0153612 A1* | 6/2010 | Zwisler .................. G06F 3/061 710/313 |
| 2011/0131287 A1* | 6/2011 | Skakkebaek ........ H04M 3/5307 709/206 |

(Continued)

OTHER PUBLICATIONS

Aust at al, Enhanced Link-Status Detection for High Speed Link Aggregation in Cognitive Radio Networks, Jul. 2008, IEICE Trans. Fundamentals, vol. E91-A,No. 7.*

(Continued)

*Primary Examiner* — Scott B Christensen
«74» *Attorney, Agent, or Firm* — Blakely, Sokoloff, Taylor & Zafman LLP

«57» ABSTRACT

A computer-implemented method is disclosed to enhance link anomaly tolerance in a small computer system interface (SCSI) system. The method starts with detecting a SCSI command failed at a SCSI target, where the SCSI target is communicatively coupled with a SCSI initiator through a set of communication links and the failed SCSI command is sent from the SCSI initiator. After detecting the failure, the SCSI target withholds returning a response for the failure. Then the SCSI target checks a status of the set of communication links periodically within the withholding duration while the response for the failed SCSI command is withheld. The SCSI target returns the response for the failed SCSI command upon at least one of two conditions is met: (1) The withhold duration expires; (2) The set of communication links is determined to function normally based on checking the status of the set of communication links.

20 Claims, 8 Drawing Sheets

(56) References Cited

U.S. PATENT DOCUMENTS

| | | | |
|---|---|---|---|
| 2011/0191644 A1* | 8/2011 | Oldfield | H04B 1/38 714/704 |
| 2011/0197091 A1* | 8/2011 | Kurasawa | G06F 11/0766 714/2 |
| 2011/0320706 A1* | 12/2011 | Nakajima | G06F 11/0793 711/114 |
| 2012/0155458 A1* | 6/2012 | Larson | H04L 67/1097 370/389 |
| 2012/0185749 A1* | 7/2012 | Okada | G06F 3/061 714/758 |
| 2012/0246345 A1* | 9/2012 | Contreras | G06F 3/0605 710/5 |
| 2013/0117621 A1 | 5/2013 | Saraiya et al. | |
| 2013/0254402 A1 | 9/2013 | Vibhor et al. | |
| 2014/0075007 A1* | 3/2014 | Kumar | H04L 67/1097 709/224 |

OTHER PUBLICATIONS

Satran et al. RFC3720. "Internet Small Computer Systems Interface (iSCSI)". Apr. 2004.*

Rajagopal, M., et al., "Fibre Channel Over TCP/IP (FCIP)", Jul. 2004, 75 pages, Network Working Group, RFC 3821, Standards Track.

Zhang, Ming, "A Not So Short iSCSI Tutorial", Oct. 2003, 37 pages, HPCL, University of Rhode Island.

Non-Final Office Action, U.S. Appl. No. 13/904,353, dated Jun. 10, 2014, 10 pages.

* cited by examiner

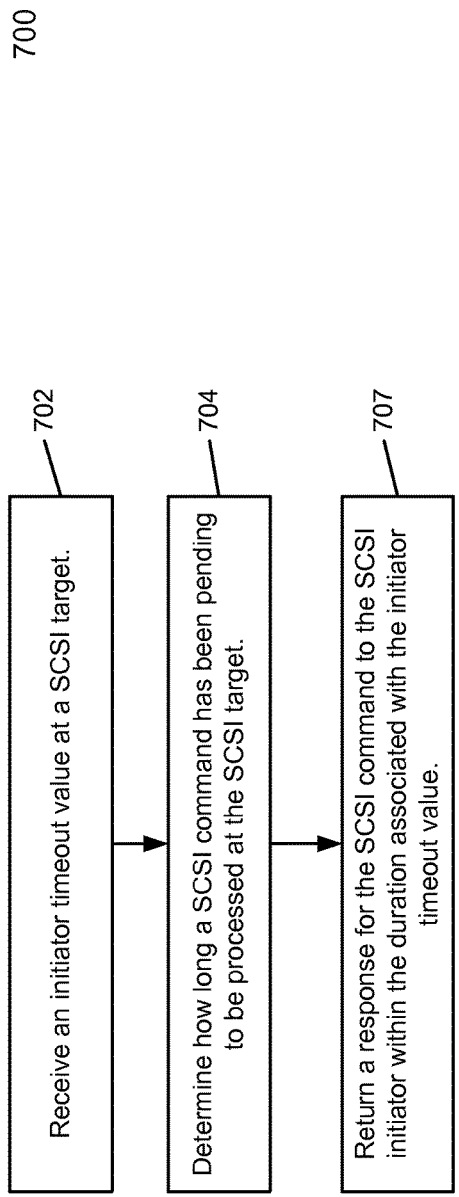
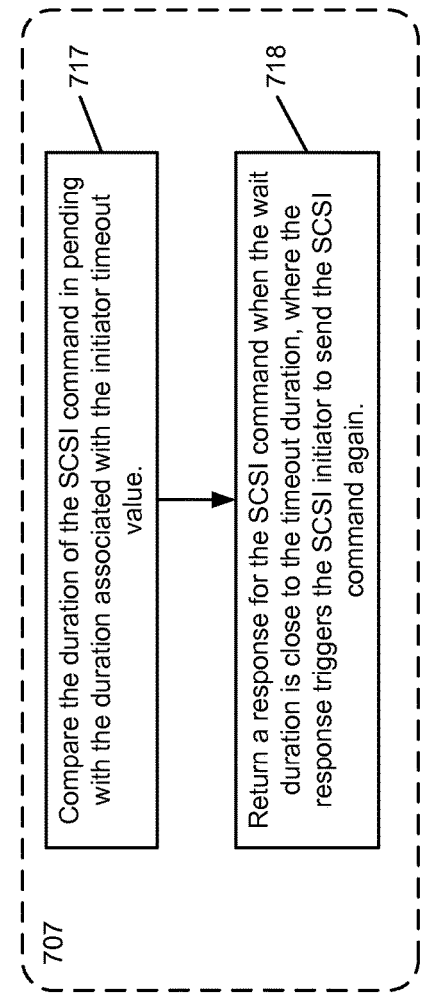

METHOD AND APPARATUS FOR ENHANCING LINK ANOMALY TOLERANCE IN A SCSI SYSTEM

RELATED APPLICATIONS

This application is related to co-pending U.S. patent application Ser. No. 13/904,353, entitled "Method and Apparatus for Enhancing Command Burst Tolerance," filed May 29, 2013, which is incorporated by reference herein in its entirety.

FIELD OF THE INVENTION

Embodiments of the present invention relate generally to systems using small computer system interface (SCSI). More particularly, embodiments of the invention relate to enhancing robustness of a SCSI system.

BACKGROUND

Small computer system interface (SCSI) is a set of standards for connecting and transferring data between computing systems including storage systems and peripheral computing devices. The SCSI standard defines command sets for a variety of device types and communications between the varieties of device types. Thus, it hides complexity of computing systems in communication, and makes computing systems independent from each other. In addition, SCSI provides high communication speed between computing systems (for example, ultra-640 offers interface speed at 640 MB/second). Because these features, SCSI has been popular since its inception in 1980s.

SCSI as an interface standard was limited to small computer systems at the beginning. In the early days of SCSI development, SCSI interfaces were limited to point to point system. Also SCSI supports only small number of devices (e.g., up to 8) addressable by logical unit numbers (LUNs), and it supports communication within limited distances (e.g., 25 meters in SCSI or 12 meters in ultra SCSI). Much progress has been made to move pass these limitations. For example, Internet small computer system interface (iSCSI) is an Internet Protocol (IP) based storage networking standard developed for applications such as linking data storage facilities. In an iSCSI-based system, SCSI commands are carried over IP networks, and iSCSI facilitates data transfers over intranets or the Internet and manages storage over long distance. With that, iSCSI can be used to transmit data over local area networks (LANs), wide area networks (WANs), storage area networks (SANs), or the Internet. It enables location-independent data storage and retrieval over long distances using existing network infrastructure. Thus iSCSI and similar variations of SCSI have gain popularity. For this specification, iSCSI and any SCSI enhancement/variations are considered as a part of the SCSI protocol family, and the methods and apparatus disclosed herein are applicable to the SCSI protocol family.

With SCSI as a protocol family now applying to communication over much longer distance than originally conceived, enhancing robustness of a SCSI system is desirable to make it more tolerance to communication anomalies and traffic burst.

BRIEF DESCRIPTION OF THE DRAWINGS

Embodiments of the invention are illustrated by way of example and not limitation in the figures of the accompanying drawings in which like references indicate similar elements.

FIG. 7A is a flow diagram illustrating the process of enhancing command burst tolerance according to one embodiment of the invention.

FIG. 7B is a flow diagram illustrating returning a response for a SCSI command according to one embodiment of the invention.

DETAILED DESCRIPTION

Figure 1:
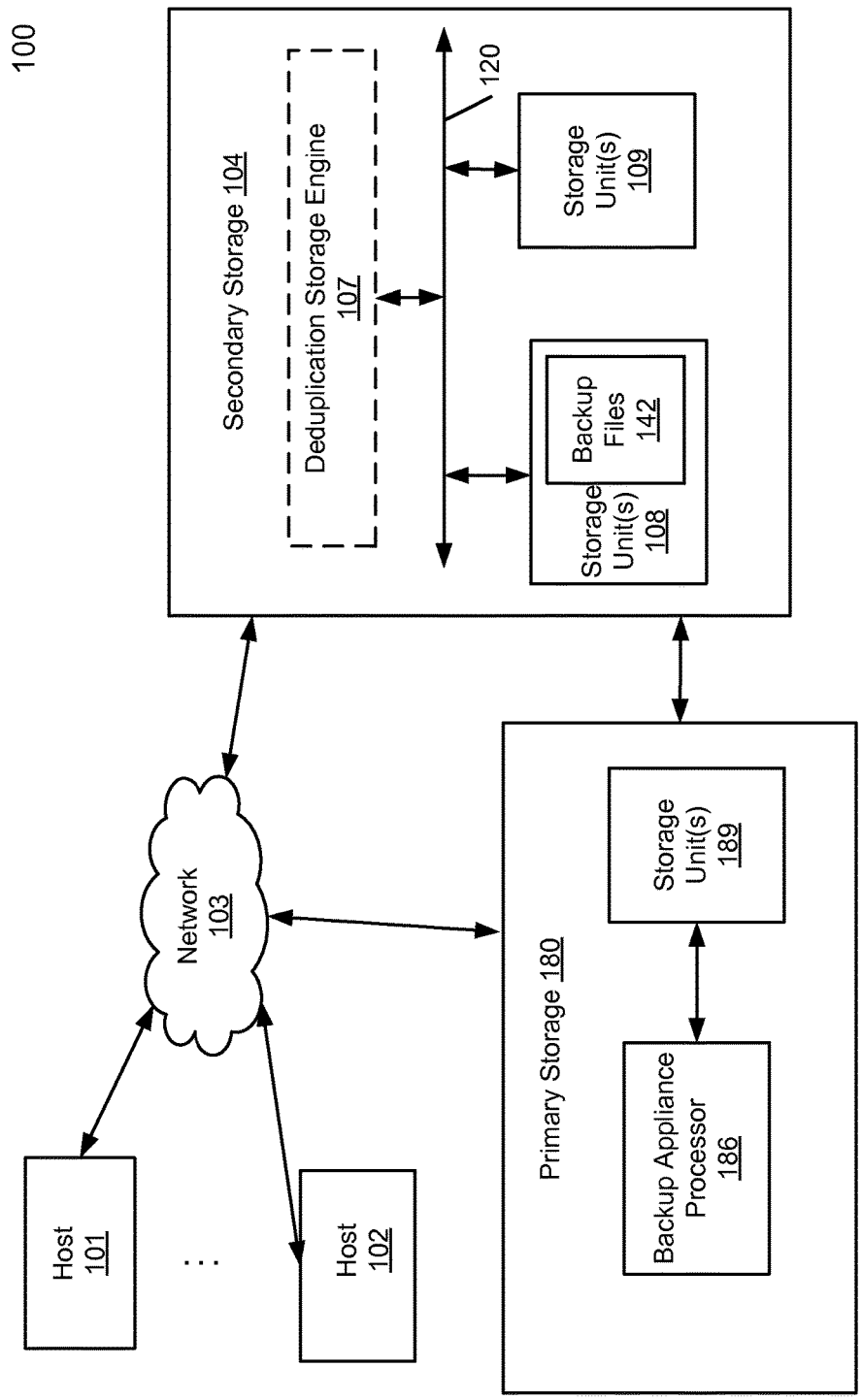
FIG. 1 is a block diagram illustrating a system for backup according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. A dataset is a collection of data that is stored in a storage space in a variety of formats.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

According to some embodiments, a computer-implemented method can be utilized to enhance link anomaly tolerance in a small computer system interface (SCSI) system. The method starts with detecting a SCSI command failed at a SCSI target, where the SCSI target is communicatively coupled with a SCSI initiator through a set of communication links and the failed SCSI command is sent from the SCSI initiator. After detecting the failed SCSI command, the SCSI target withholds returning a response for the failed SCSI command to the SCSI initiator. Then the SCSI target checks a status of the set of communication links periodically within the withholding duration while the response for the failed SCSI command is withheld. The SCSI target returns the response for the failed SCSI command to the SCSI initiator upon at least one of two conditions is met: (1) The withhold duration expires; (2) The set of communication links is determined to function normally based on checking the status of the set of communication links.

According to some embodiments, a SCSI target can be implemented to enhance link anomaly tolerance in a SCSI system. The SCSI target is communicatively coupled with a SCSI initiator through a set of communication links. It contains a target input/output (I/O) interface configured to detect that a SCSI command failed, where the failed SCSI command is sent from the SCSI initiator. The SCSI target also contains a link status checker configured to check statuses of the set of communication links periodically within a withholding duration. The SCSI target further contains a target processor configured to withhold returning a response for the failed SCSI command to the SCSI initiator after the target I/O interface detects that the SCSI command failed, and the SCSI target returns the response for the failed SCSI command to the SCSI initiator upon at least one of two conditions is met: (1) The withhold duration expires; (2) The set of communication links is determined to function normally based on checking the status of the set of communication links.

According to some embodiments, a computer-implemented method can be utilized to enhance command burst tolerance in a SCSI system. The method starts with receiving an initiator timeout value at a SCSI target, where the SCSI target is communicatively coupled with a SCSI initiator through a set of communication links, and where the initiator timeout value is associated with a timeout duration after which the SCSI initiator times out if receiving no response from the SCSI target after sending a SCSI command. After receiving the initiator timeout value, the SCSI target determines how long a SCSI command has been pending to be processed at the SCSI target. The SCSI target then returns a response for the SCSI command to the SCSI initiator within the timeout duration associated with the initiator timeout value even if the SCSI command is pending to be processed at the SCSI target.

According to some embodiments, a SCSI target can be implemented to enhance command burst tolerance in a SCSI system. The SCSI target contains a SCSI target processor configured to receive an initiator timeout value, where the initiator timeout value is associated with a timeout duration after which the SCSI initiator times out if receiving no response from the SCSI target after sending a SCSI command. The SCSI target processor is further configured to determine how long a SCSI command has been pending to be processed at the SCSI target and return a response for the SCSI command to the SCSI initiator within the timeout duration associated with the initiator timeout value even if the SCSI command is pending to be processed at the SCSI target.

System Configuration

FIG. 1 is a block diagram illustrating a system for backup according to one embodiment of the invention. Referring to FIG. 1, system 100 includes, but is not limited to, one or more hosts 101-102 communicatively coupled to primary storage 180 and secondary storage 104 over network 103. Hosts 101-102 may be any type of hosts such as a server, a personal computer (e.g., desktops, laptops, and tablets), a "thin" client, a personal digital assistant (PDA), a Web enabled system, a gaming device, a media player, or a mobile phone (e.g., Smartphone), etc. Network 103 may be any type of network such as a local area network (LAN), a wide area network (WAN) such as Internet, a corporate intranet, a metropolitan area network (MAN), a storage area network (SAN), a bus, or a combination thereof, wired and/or wireless.

Both primary and secondary storage systems 180 and 104 may include any type of server or cluster of servers. For example, they may be storage servers used for any of various different purposes, such as to provide multiple users with access to shared data and/or to back up mission critical data. They may be, for example, a file server (e.g., an appliance used to provide network attached storage (NAS) capability), a block-based storage server (e.g., used to provide storage area network (SAN) capability), a unified storage device (e.g., one which combines NAS and SAN capabilities), a nearline storage device, a direct attached storage (DAS) device, a tape backup device, or essentially any other type of data storage device. Both primary and secondary storage systems 180 and 104 may have a distributed architecture, or all of their components may be integrated into a single unit. Both primary and secondary storage systems 180 and 104 may be implemented as part of an archive and/or backup storage system such as a de-duplication storage system available from EMC® Corporation of Hopkinton, Mass.

In one embodiment, primary storage 180 includes a backup appliance processor 186. Backup appliance processor 186 coordinates with primary storage 180, secondary storage 104, and hosts 101/102 to run various backup and restoration operations including replication. Backup appliance processor 186 may coordinate both backup and restoration operations. In one embodiment, backup appliance processor 186 coordinates backup and restoration operations between hosts 101/102 and primary storage 180, where the data from hosts 101/102 are backed up to and restored from storage units 189. In another embodiment, backup appliance processor 186 coordinates backup and restoration operations between primary storage 180 and secondary storage 104, where the data from storage units 189 of primary storage 180 are backed up to storage units 108-109 at secondary storage 104 (sometimes primary storage 180 and secondary storage 104 are referred to as cascaded storages). Note while backup appliance processor 186 is illustrated within primary storage 180 in FIG. 1, in some embodiments, backup appliance processor 186 is embedded within secondary storage 104 or it is embedded within a standalone backup appliance server that communicatively coupled with primary storage 180 and secondary storage 104.

Both primary storage 180 and secondary storage 104 may perform deduplication. The deduplication processes performed and storage units allocated are similar between primary storage 180 and secondary storage 104, thus only the processes and storage units within one of them are disclosed below for illustration. In one embodiment, secondary storage 104 may include, but is not limited to, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID). Backup files 142 represent data stored in storage units 108.

In response to a request to store data in storage units 108-109, optional deduplication storage engine 107 is configured to segment the data into multiple segments (also referred to as data chunks or simply chunks) according to a variety of segmentation policies or rules. Deduplication storage engine 107 only stores a segment in a storage unit if the segment has not been previously stored in the storage unit. In the event that a segment has been previously stored, metadata stores information enabling the reconstruction of a dataset using the previously stored segment. As a result, segments of datasets are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

The metadata may be stored in at least some of storage units 108-109, such that data can be accessed independent of another storage unit. Metadata of each storage unit includes enough information to provide access to the data it contains. When an active storage unit fails, metadata contained in another storage unit may be utilized to recover the active storage unit. When one storage unit is unavailable (e.g., the storage unit has failed, or is being upgraded, etc.), the system remains up to provide access to any data not stored in the failed storage unit. When data is deleted, the metadata associated with the data in the system is updated to reflect that the data has been deleted.

In one embodiment, the metadata information includes a data identifier, a storage unit where the segments associated with the data identifier are stored, reconstruction information for the data using the segments, and any other appropriate metadata information. In one embodiment, a copy of the metadata is stored on a storage unit for data stored on a storage unit so that data that are stored on the storage unit can be accessed using only the information stored on the storage unit. In one embodiment, a main set of metadata information can be reconstructed by using information of other storage units associated with the secondary storage in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units).

In one embodiment, each storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Data are periodically moved among the tiers based on data management policies to achieve a cost-effective match to the current storage requirements of the datasets. For example, a data may initially be stored in a tier of storage that offers high performance for reads and writes. As the data ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, backup appliance processor 186 is configured to back up data from storage unit 189 and to store the backed-up data in one or more of storage units 108-109 of secondary storage 104, where the data may be deduplicated by deduplication storage engine 107. A user (e.g., an administrator) initiates a backup request, directly or through a backup schedule, of primary storage 180.

Primary storage 180 may include any type of server or cluster of servers (e.g., remote servers). For example, primary storage 180 may be a storage server used for any of various different purposes, such as to provide multiple users with access to shared data and/or to back up mission critical data. Primary storage 180 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, or essentially any other type of data storage device. Primary storage 180 may have a distributed architecture, or all of its components may be integrated into a single unit. Primary storage 180 may be implemented as part of a storage system available from EMC® Corporation of Hopkinton, Mass.

Primary storage 180 contains storage unit 189, which represent the data stored in the primary storage. Storage unit 189 may be stored across a number of logical units, and each logical unit is identified by a logical unit number (LUN). Each logical unit may contain a number of sectors. A number of consecutive sectors may be aggregated to form a block for backup data transfer. The backup data transfer in FIG. 1 complies with an implementation of SCSI thus primary storage 180 and secondary storage 104 can be viewed as a SCSI system.

A SCSI system contains at least a SCSI initiator and a SCSI target. Unlike Ethernet protocols, where two communicating parties can both initiate a communication session, the SCSI initiator is always the one initiating communication with the SCSI target in a SCSI system. In a SCSI system, a SCSI initiator initiates a communication session with a request, commonly referred to as an input/output (I/O), to a SCSI target. The SCSI target responds to the request to perform operations such as read, write, xcopy (extended copy), and etc.

A computing system, including storage systems and peripheral computing devices, can be a SCSI initiator and a SCSI target at the same time for different SCSI sessions. For example, primary storage 180 is a SCSI target when host 101 sends over data to primary storage 180 for backup. Yet primary storage 180 is a SCSI initiator when it sends over data to secondary storage 104 for backup. Without being noted otherwise, embodiments of the invention can be implemented for communications between hosts 101/102 and primary storage 180, and between primary storage 180 and secondary storage 104. Indeed, embodiments of the invention can be implemented in any SCSI system containing a SCSI initiator and a SCSI target to enhance robustness of the SCSI system.

Embodiments of Invention for Enhancing Link Anomaly Tolerance

Figure 2:
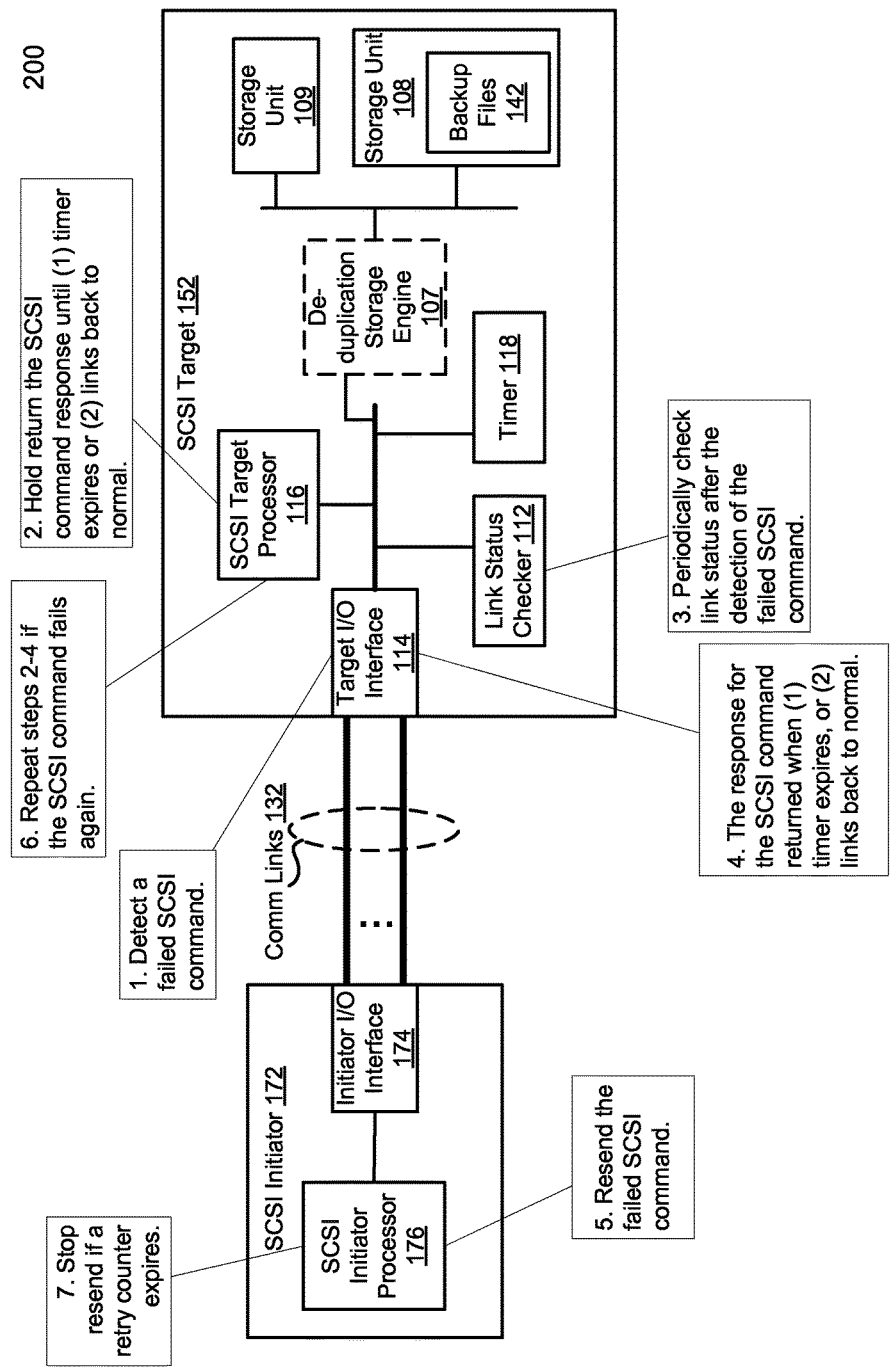
FIG. 2 is a block diagram illustrating a process of enhancing link anomaly tolerance at a SCSI system according to one embodiment of the invention.

FIG. 2 is a block diagram illustrating a process of enhancing link anomaly tolerance at a SCSI system according to one embodiment of the invention. In one embodiment, system 200 is a zoom-in of a portion of system 100 in FIG. 1. System 200 may represent hosts 101/102 (SCSI initiator 172 of FIG. 2) and primary storage 180 (SCSI target 152 of FIG. 2), and it may also represent primary storage 180 (SCSI initiator 172 of FIG. 2) and secondary storage 104 (SCSI target 152 of FIG. 2).

SCSI initiator 172 contains SCSI initiator processor 176 and initiator I/O interface 174. SCSI initiator processor 176 may be implemented as a part of backup appliance processor 186 of FIG. 1 but it may also be implemented as a standalone processor coordinating SCSI communication with SCSI target 152. Initiator I/O interface 174 is the input/output interface through which SCSI initiator 172 communicates with SCSI target 152. That is, commands, data, status and messages are transmitting to and from initiator I/O interface 174 for SCSI initiator processor 176 to process.

SCSI target 152 contains SCSI target processor 116, target I/O interface 114, link status checker 112, timer 118, and storage units 108-109. Optionally, SCSI target 152 may also contain deduplication storage engine 107. Deduplication storage engine 107 and storage units 108-109 serve the same functions as the blocks with the same references as in FIG. 1. SCSI target processor 116 is the processor coordinating SCSI communication with SCSI initiator 172. Target I/O interface 114 is the input/output interface through which SCSI target 152 communicates with SCSI initiator 172. Through target I/O interface 114 and initiator I/O interface 174, SCSI target 152 and SCSI initiator 172 are communicatively coupled with each other through a set of communication links, communication links 132.

Communication links 132 may be built using a variety of media. The medium may be made of optical fibers. Communication links 132 may be fiber channels (FCs) and SCSI initiator 172 communicates with SCSI target 152 through a storage area network (SAN). Fiber channel protocol (FCP) is then utilized for communication between SCSI initiator 172 and SCSI target 152. When communication links 132 passes through an Ethernet network, a different protocol, such as fiber channel over Transmission Control Protocol/Internet Protocol (TCP/IP) (FCIP) may be utilized for communication between SCSI initiator 172 and SCSI target 152. The medium may also be made of copper and communication links 132 are copper wires (such as twisted pairs) or other suitable media. Both FCP and FCIP may be utilized for the communication between the two parties with other media. Communication links 132 may contain a set of one or more links.

Link status checker 112 is configured to check the health of communication links 132. The checking may be initiated manually or through a schedule. The schedule may be based on a setting within timer 118. Timer 118 is configured to store various timers to keep track of time passed by since a starting point. An operator may set a duration value associated with a timer within timer 118. One or more modules of link status checker 112 and timer 118 may be implemented as a module within target I/O interface 114. Target I/O interface 114 in term may be integrated with SCSI target processor 116 in some embodiments.

Task boxes 1 to 7 illustrate the order in which operations are performed according to one embodiment of the invention. At task box 1, SCSI target 152 detects a failed SCSI command at target I/O interface 114. The SCSI command may be determined to fail for a variety of reasons. For example, the received SCSI command contains a bad checksum. After detecting the failed SCSI command, SCSI target processor causes no status regarding the failed SCSI command to return to the sending SCSI initiator 172 at tax box 2. That is, after SCSI target 152 has detected a failed SCSI command, it does not return a response to SCSI initiator 172 immediately. Instead, it withholds any response for a period.

Note that in prior art, a SCSI target returns a status message to a sending SCSI initiator immediately after determining that a received SCSI command has failed. The sent status message (e.g., a status and a check condition code meaning retry, chk_cond( )) will be received at the SCSI initiator, and the SCSI initiator will immediately resend the failed SCSI command (typically within milliseconds) after receiving the status. The immediate retry may work fine in a setup where communication links between the SCSI initiator and target are short and relatively noise free cables (e.g., a short 12 meter cable for communication via ultra SCSI). Yet when the communication links are noisier and span over a much longer distance, an anomaly (which causes the failed SCSI command) in the communication links may not be resolved instantaneously (often resolving communication link anomalies takes seconds, not milliseconds). A retry right after a failed command likely results in failure again as the communication link anomaly has not been resolved yet. Yet, often a SCSI initiator can only retry a limited times for a given command implementation to save source consumption. In some systems, a SCSI initiator can only retry three times before the SCSI initiator declares that the SCSI target is faulty. Once the SCSI is declared faulty, it would require a much bigger recovery effort and take a much longer time (often in minutes) to recover. For example, the SCSI initiator may have to resend all of the SCSI commands that are pending and have not been processed by the SCSI target prior to the link faulty. Thus, by withholding a status of a failed SCSI command to SCSI initiator 172, embodiments of the invention prevent futile retries by SCSI initiator 172, while it allows the SCSI target additional time to process the pending SCSI commands.

Referring back to task box 2, SCSI target processor 116 withholds a response for the failed SCSI command for a period. The duration of the period depends on at least two events. One is that a withholding duration expires. The withholding duration is a duration that that SCSI target 152 will withhold the response for the failed command if no other event happens, i.e., the default withholding time. The other is a determination of health of communication links 132. If the communication links are determined to be normal thus a resending of the failed command would be able to received properly at SCSI target 152, the response for the failed SCSI command will be returned even though the without duration has not expired yet.

At task box 3, link status checker 112 is configured to periodically check communication links 132 after detecting the failed SCSI command. The periodical checking occurs at an interval duration less than the withholding duration thus link status checker 112 may determine that communication links 132 have back to normal and thus return the response for the failed SCSI command sooner than waiting for the full withholding duration. The rationale behind it is that if the link returns to normal within a short period of time, the link should not be considered as faulty and SCSI initiator 172 should be able to resend the failed SCSI command. Note values of both the withholding duration and the interval duration are configurable and may be provisioned by an operator of the SCSI system or set by manufacturer of the SCSI system by default. In one embodiment, the withholding duration is set to be around 10 seconds while the interval duration for checking is 0.5 second.

At task box 4, the response for the failed SCSI command is returned from target I/O interface 114 through communication links 132 to SCSI initiator 172. The response is returned when either the withholding duration has expired or the communication links 132 are back to normal. In one embodiment, the response is a status message (e.g., a status and a check condition code meaning retry, chk_cond( )).

At task box 5, SCSI initiator 172 resends the failed SCSI command once it receives the response of the failed SCSI command. The resend happens right after receiving the response of the failed SCSI command. The resend may or may not use the same link when communication links 132 contains multiple links between SCSI initiator 172 and SCSI target 152. In one embodiment, the resend uses a different link from the link used in the first sending of the failed command.

At task box 6, if SCSI target processor 116 determines that resent SCSI command has failed again, steps 2-4 will be repeated at SCSI target 152. However, if the resent SCSI command is determined to be transmitted successfully, the process completes successfully for the earlier failed SCSI command, and the command will be processed and SCSI target 152 may performs various operations, such as read, write, and/or xcopy (extended copy), depending on the content of the now successfully received SCSI command.

At task box 7, SCSI initiator 172 receives a response indicating that the earlier failed command has failed again. SCSI initiator 172 then determines how many times the SCSI command has been sent from SCSI initiator 172 to SCSI target 152. SCSI initiator 172 contains a counter to keep track of times each command has been sent from the initiator to SCSI target 152. The counter is also associated with a maximum counter value, and if the times that a command has been sent reach the maximum counter value, SCSI initiator 172 no longer sends the command to SCSI target 152. In one embodiment, SCSI initiator 172 declares that SCSI target 152 is faulty and a bigger recovery effort such as rescanning will be initiated. Note the maximum counter value, withholding duration, and the interval of checking communication links are configurable depending on application and it may be adjusted based on quality of communication links 132 and efficiency of recovery mechanism of the communication links.

Figure 3:
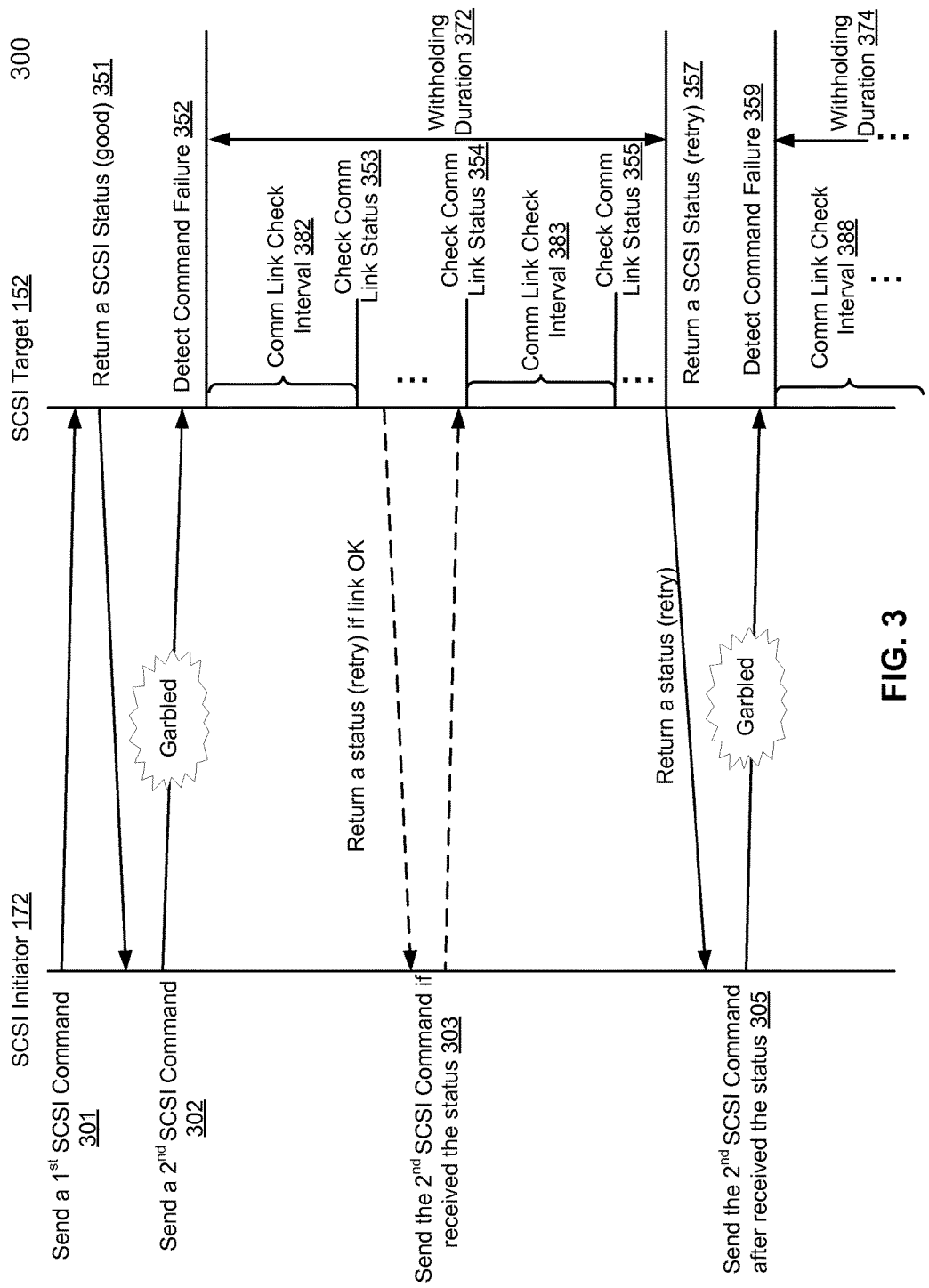
FIG. 3 is a block diagram illustrating interactions between a SCSI initiator and a SCSI target implementing the process of enhancing link anomaly tolerance according to one embodiment of the invention.

FIG. 3 is a timeline diagram illustrating interactions between a SCSI initiator and a SCSI target implementing the process of enhancing link anomaly tolerance according to one embodiment of the invention. SCSI Initiator 172 sends a first SCSI command to SCSI target 152 at reference 301. The command is received at SCSI target 152, and the command is determined without error, thus SCSI target 152 returns a SCSI status normal at reference 351.

Then SCSI initiator 172 sends a second SCSI command to SCSI target 152 at reference 302. The second command does not reach SCSI target 152 error-free. Instead, it was garbled due to a communication link anomaly. At reference 352, SCSI target 152 detects the failed SCSI command. It then starts to a timer to keep track of time to withhold a response to the failed SCSI command. The withhold duration is at reference 372. During the withholding duration 372, SCSI target 152 periodically checks communication link status at an interval at 382, starting from detecting the command failure at reference 352. Communication link check interval, as illustrated at references 382-388, is smaller than withholding durations 372-374. Thus, SCSI target 152 may check the communication links multiple times during withholding durations. When the checking at references 353-355 results in a determination that the communication links are healthy, SCSI target 152 returns a status of the SCSI command with a retry indication (a type of response for the failed SCSI command to invite the SCSI initiator to resend the failed SCSI command). If SCSI initiator 172 receives the status of the second SCSI command with a retry indication, it will resend the second SCSI command at reference 303.

When checking communication link status 353-355 result in determinations that communication links are still having anomaly, SCSI target 152 returns a status message of the SCSI command with an indication meaning retry (a type of response for the failed SCSI command) at reference 357. Once SCSI initiator 172 receives the status, it will resend the second SCSI command at reference 305. Assuming the SCSI command is garbled still by noisy communication links, the process of withholding SCSI retry will be repeated starting from detecting the command failure at reference 359. As discussed herein above, the withholding process will continue until either the failed command has been received at SCSI target 152 error free, or SCSI initiator 172 has reached its maximum retry counter and it then declares SCSI target 152 faulty and start a bigger recovery effort known in the art.

Figure 4:
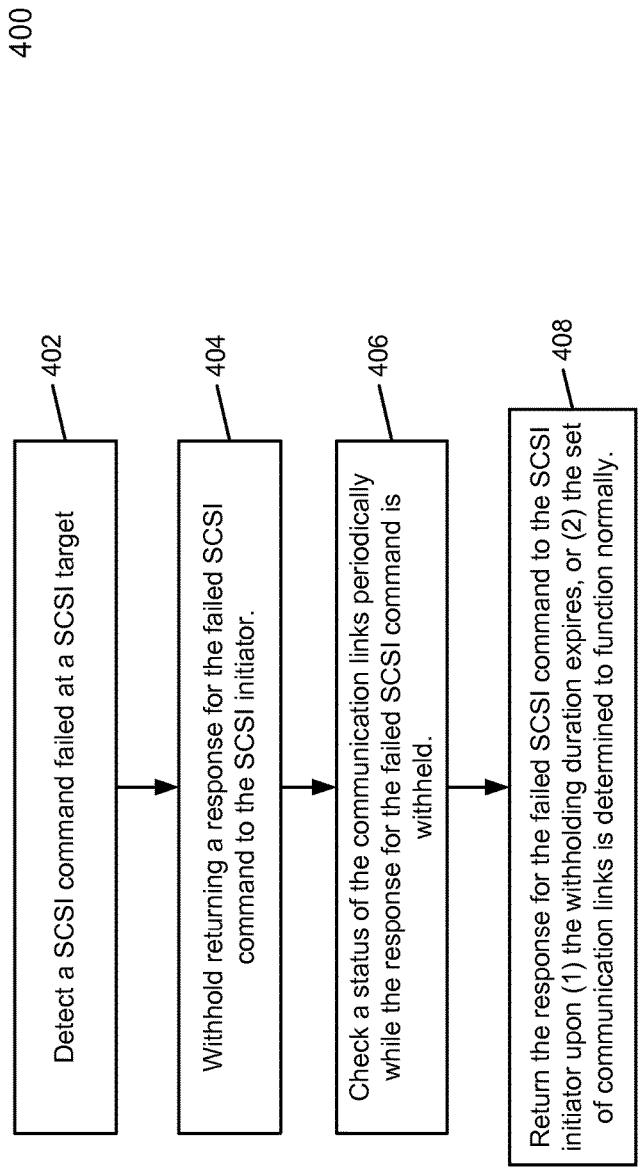
FIG. 4 is a flow diagram illustrating the process of enhancing link anomaly tolerance according to one embodiment of the invention.

FIG. 4 is a flow diagram illustrating the process of enhancing link anomaly tolerance according to one embodiment of the invention. Process 400 may be implemented at a SCSI target of a SCSI system, which also contains a SCSI initiator sending commands to the SCSI target. The process starts with operation 402, where a failed SCSI command is detected at the SCSI target. The SCSI command may be determined to fail for a variety of reasons. For example, the received SCSI command contains a bad checksum. Then at operation 404, the SCSI target withholds returning a response for the failed SCSI command to the sending SCSI initiator. At operation 406, the SCSI target checks a status of the communication links between the SCSI initiator and the SCSI target periodically while the response for the failed SCSI command is withheld. The checking is to determine whether the communication links function normally. The interval of checking is shorter than a withholding period. Then at operation 408, the SCSI target returns the response for the failed SCSI command to the SCSI initiator if one of two conditions is met. The first is the withholding duration expires, and the other is that the SCSI target determines that the communication links between the SCSI initiator and the SCSI target are in a normal condition thus the SCSI initiator can resend the failed SCSI command.

Embodiments of Invention for Enhancing Command Burst Tolerance

The discussion herein above discloses an enhancement to a SCSI system to make it more robust in tolerating temporary communication link failures. Another area of interest in a SCSI system is how to improve a SCSI target's capability to process command burst from a SCSI initiator. Often a SCSI target has multiple commands to process. For each command, the SCSI target needs to perform one or more operations such as read, write, xcopy, and etc. Thus some commands will wait at the SCSI target pending to be processed. Because these commands have not been processed, no response for these commands would be sent to the sending SCSI initiator. At the sending SCSI initiator, it keeps a timeout duration for commands. After a command is sent, if no response for the command is returned to the sending SCSI initiator within the timeout duration, the sending SCSI initiator may send out an abort management command (a type of command for managing the SCSI system), asking the SCSI target to abort processing commands. The abort management command causes the SCSI target to abort all commands pending to be processed. Then the SCSI initiator will resend these aborted commands again, which create another batch of commands for the SCSI target to process.

Thus, the SCSI target's inability to process a first batch of commands triggers the creation a second and sometimes bigger batch of commands. The second batch of commands may be bigger as it may contain even more commands than the first batch because the second batch contains new commands generated at the SCSI initiator in addition to the aborted commands of the first batch. That is, batches of commands, referred to as command bursts, can be self-compounding. The self-compounding commands will eventually crash the SCSI initiator.

Command burst is not uncommon in a SCSI system as command processing at a SCSI target takes some time per command and its corresponding SCSI initiator may generate commands in bursts. As discussed herein above, the burst commands may crash the SCSI initiator if the SCSI target cannot process the commands in time. Yet, the SCSI target may be able to process the commands if generated at a more even pace. Thus, it is desirable to enhance the SCSI target's capability to deal with command bursts.

Figure 5:
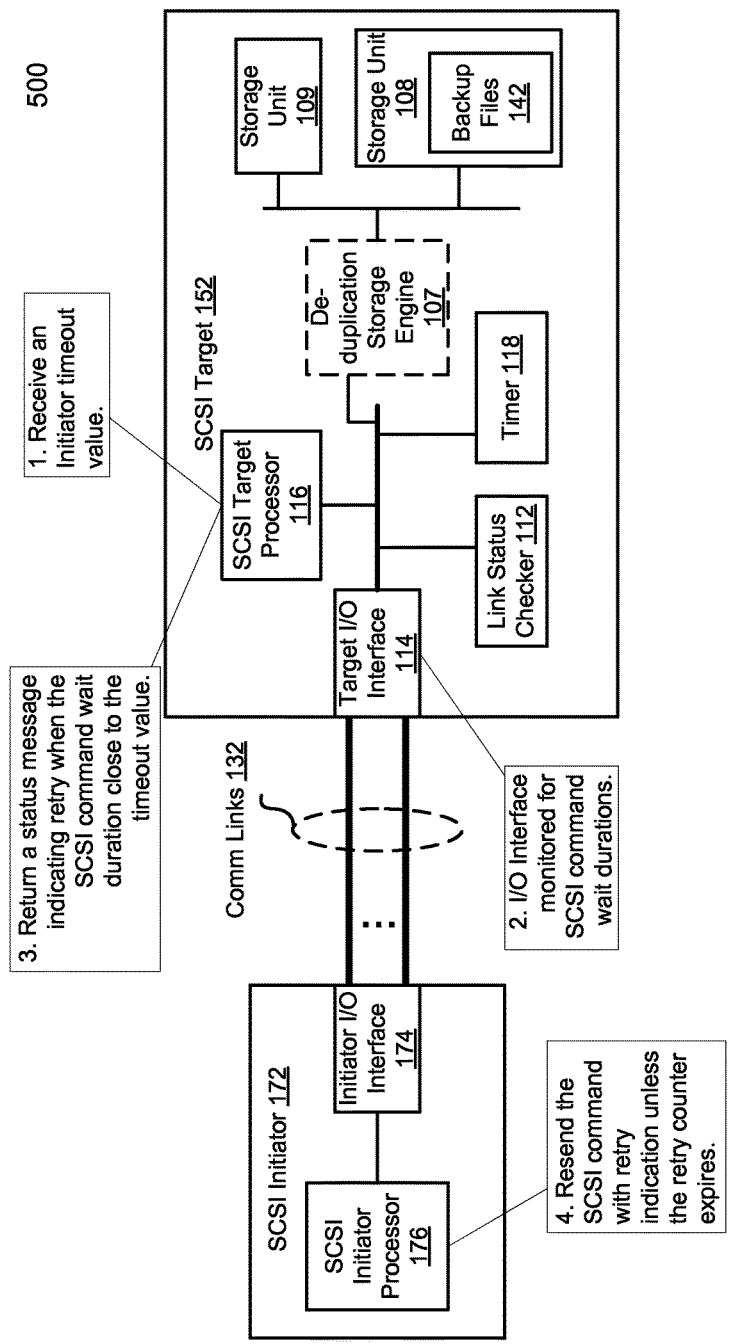
FIG. 5 is a block diagram illustrating a process of enhancing command burst tolerance at a SCSI system according to one embodiment of the invention.

FIG. 5 is a block diagram illustrating a process of enhancing command burst tolerance at a SCSI system according to one embodiment of the invention. System 500 is similar to system 200, and the same or similar references indicate elements or components having the same or similar functionalities.

Task boxes 1 to 5 illustrate the order in which operations are performed according to one embodiment of the invention. At task box 1, SCSI target processor 116 receives an initiator timeout value. The initiator timeout value is associated with a timeout duration after which the initiator times out if receiving no response from SCSI target 152 after sending a SCSI command. The initiator timeout value is configurable and may be different from one SCSI initiator to another. The initiator timeout value may be manually entered at SCSI target 152. It may be sent using an existing management command from SCSI initiator 172 to SCSI target 152. Since sending initiator timeout value is not defined in a standard, one may add a new mode select page. Furthermore, the initiator timeout value may be sent using a new vendor unique SCSI command from SCSI initiator 172 to SCSI target 152.

Once SCSI target 152 receives the timeout value, target I/O interface 114 is monitored and wait durations of SCSI commands pending to be processed are determined at task box 2. SCSI target processor 116 determines how close the wait durations of the SCSI commands to the timeout value. If a received command is processed, a status message indicating normal operation (e.g., a good status) is returned to SCSI initiator 172.

At task box 3, SCSI target processor 116 returns a status message (e.g., a status and a check condition code meaning retry, chk_cond( )) for the SCSI command whose wait duration is close to the timeout value of SCSI initiator 172. The closeness of a wait duration to the timeout value can be compared to a threshold, and when the difference between the timeout value and the wait duration of a SCSI command is below and coming close to the threshold, the SCSI command is deemed to be waiting for too long and SCSI initiator 172 would timeout without receiving a response. Thus SCSI target processor 116 returns the retry status message (e.g., a status and a check condition code meaning retry, chk_cond( )).

At task box 4, after receiving the retry status message, SCSI initiator 172 will resend the SCSI command to SCSI target 152 unless a retry counter associated with the SCSI command expires. SCSI initiator 172 determines how many times the SCSI command has been sent from SCSI initiator 172 to SCSI target 152. SCSI initiator 172 contains a counter to keep track of times each command has been sent from the initiator to SCSI target 152. The counter is also associated with a maximum counter value, and if the times that a command has been sent reach the maximum counter value, SCSI initiator 172 no longer sends the command to SCSI target 152. In one embodiment, SCSI initiator 172 declares that SCSI target 152 is faulty and a bigger recovery effort such as rescanning will be initiated.

Figure 6:
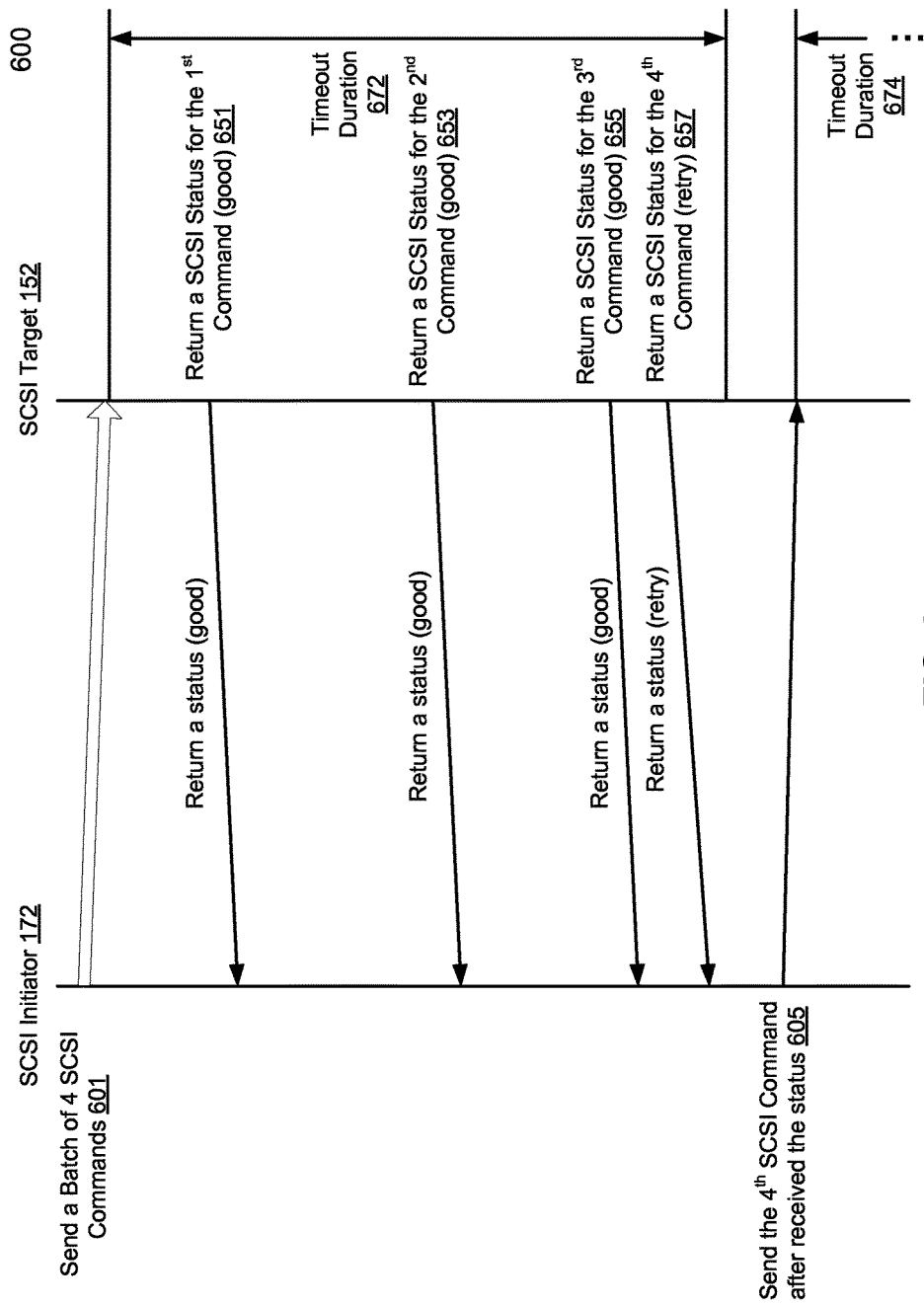
FIG. 6 is a block diagram illustrating interactions between a SCSI initiator and a SCSI target implementing the process of enhancing command burst tolerance according to one embodiment of the invention.

FIG. 6 is a timeline diagram illustrating interactions between a SCSI initiator and a SCSI target implementing the process of enhancing command burst tolerance according to one embodiment of the invention. SCSI Initiator 172 sends a batch of four SCSI commands at reference 601. The commands are sent to SCSI target 152, and SCSI target 152 starts monitoring the wait durations of these commands. The timeout duration is illustrated at reference 672. Note for simplicity of illustration, the batch of four commands are shown as arriving at the same time at SCSI target 152. In practice, commands generally do not arrive at the same time, and timeout duration needs to be monitored on each command. Also, SCSI target 152 may have other commands pending to be processed prior to the arrival of the batch of four SCSI commands, and the other commands need to be monitored too.

At reference 651, a first command is processed and the SCSI command with a status good is returned to SCSI initiator 172, which means the transmission and process has completed normally at SCSI target 152. Similarly, at references 653-655, a second and a third commands are processed and the SCSI commands with good statuses are returned to SCSI initiator 172. Note one command has not been processed yet, and timeout duration 672 is close to expire, thus, SCSI target 152 returns a response for the fourth command, indicating the fourth command needs retry. SCSI initiator 172 receives the response for the fourth command and it sends the fourth SCSI command at reference 605. Note right after SCSI target 152 receives the fourth command, it starts counting wait time of the command, in comparison to timeout duration 674.

By providing a response for a command that is pending to be processed, SCSI target 152 prevents SCSI initiator 172 times out and thus avoid burst compounding where SCSI initiator 172 requests SCSI target 152 aborts all commands in waiting, thus embodiments of the invention enhances a SCSI target's capability to be tolerated toward command bursts.

FIG. 7A is a flow diagram illustrating the process of enhancing command burst tolerance according to one embodiment of the invention. Process 700 may be implemented at a SCSI target of a SCSI system, which also contains a SCSI initiator sending commands to the SCSI target.

The process starts with operation 702, where the SCSI target receives an initiator timeout value. The initiator timeout value is associated with a timeout duration after which the initiator times out if receiving no response from a SCSI target after sending a SCSI command. The initiator timeout value is configurable and may be different from one SCSI initiator to another. The initiator timeout value may be manually entered at the SCSI target. It may be sent using an existing management command from the SCSI initiator to the SCSI target. Since sending initiator timeout value is not defined in a standard, one may add a new mode select page. Furthermore, the initiator timeout value may be sent using a new vendor unique SCSI command from the SCSI initiator to the SCSI target. In one embodiment, the initiator timeout value is around 30 seconds.

At operation 704, the SCSI target determines how long a SCSI command has been pending to be processed at the SCSI target. The duration of pending is measured from the moment the SCSI command is received at the SCSI target. Then at operation 707, the SCSI target returns a response for the SCSI command to the SCSI initiator within the duration associated with the initiator timeout value. That is, even if the SCSI target has not processed the command, the response for the SCSI command is returned to the SCSI initiator.

FIG. 7B is a flow diagram illustrating returning a response for a SCSI command according to one embodiment of the invention. Operations 717-718 are one embodiment implementing operation 707 of FIG. 7A. At operation 717, the SCSI target compares a duration of the SCSI command in pending for being processed with the duration associated with the initiator timeout value. Then at operation 718, the SCSI target returns a response for the SCSI command when the wait duration is close to the timeout duration. The response triggers the SCSI initiator to send the SCSI command again. As discussed herein above, the closeness of a wait duration to the timeout value can be compared to a threshold, when the difference between the timeout value and the wait duration of a SCSI command is below and coming close to the threshold, the SCSI command is deemed to be waiting for too long, and the response for the SCSI command will be returned through operation 718.

Embodiments of Deduplication

Figure 8:
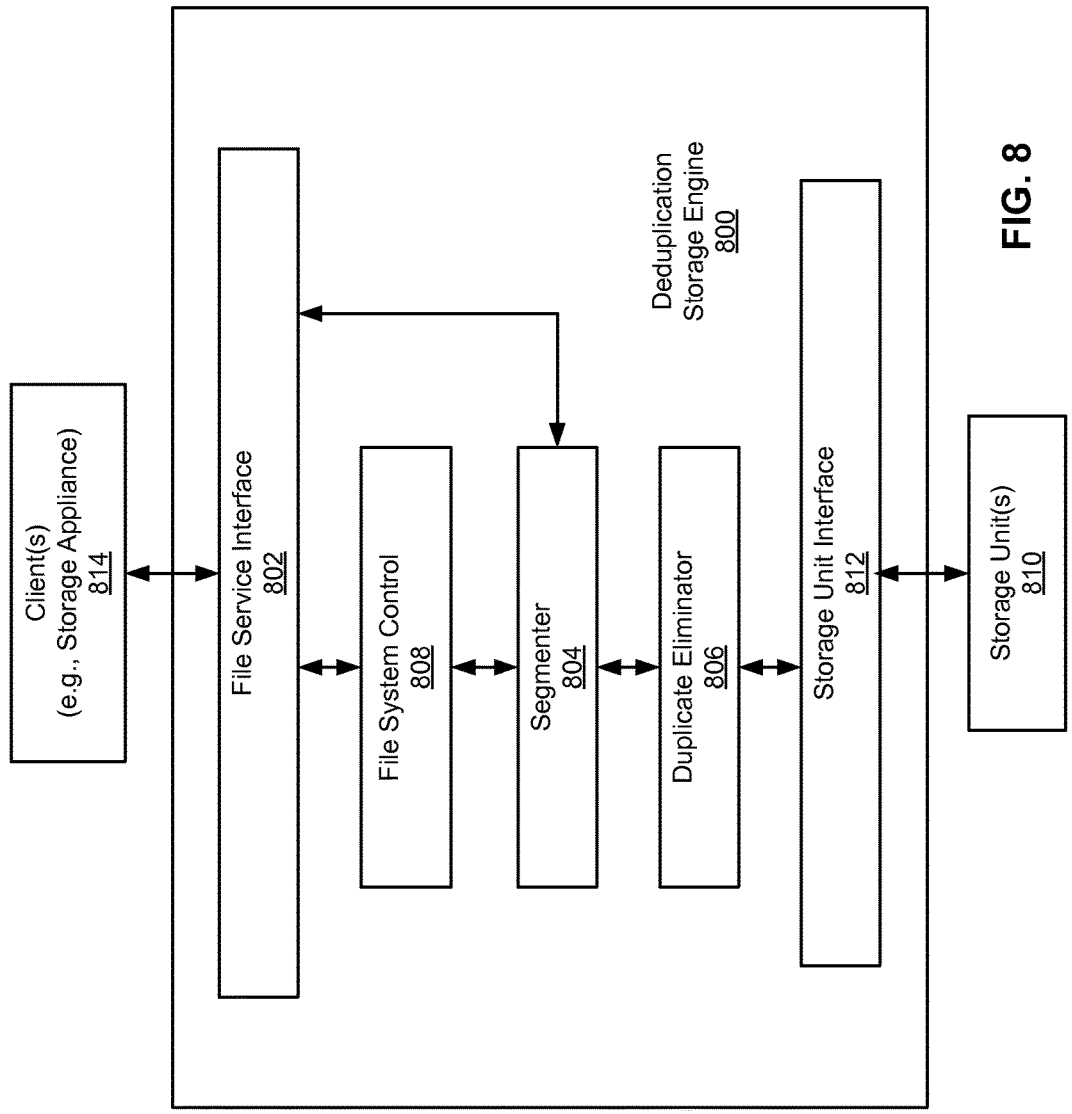
FIG. 8 is a block diagram illustrating a segment storage engine according to one embodiment of the invention.

FIG. 8 is a block diagram illustrating a segment storage engine according to one embodiment of the invention. For example, deduplication storage engine 800 may be implemented as part of a deduplication storage system as described above, such as deduplication storage engine 107 of FIG. 1. The embodiments of deduplication can be implemented at either primary storage 180 or secondary storage 104 of FIG. 1.

Referring to FIG. 8, in one embodiment, deduplication storage engine 800 includes file service interface 802, segmenter 804, duplicate eliminator 806, file system control 808, and storage unit interface 812. Deduplication storage engine 800 receives a file or files (or dataset(s)) via file service interface 802, which may be part of a file system namespace of a file system associated with the deduplication storage engine 800. The file system namespace refers to the way files are identified and organized in the system. An example is to organize the files hierarchically into directories or folders. File service interface 802 supports a variety of protocols, including a network file system (NFS), a common Internet file system (CIPS), and a virtual tape library interface (VTL), etc.

The file(s) is/are processed by segmenter 804 and file system control 808. Segmenter 804 breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 808 processes information to indicate the segment(s) association with a file. In some embodiments, a list of fingerprints is used to indicate segment(s) associated with a file. File system control 808 passes segment association information (e.g., representative data such as a fingerprint) to an index (not shown). The index is used to locate stored segments in storage units 810 via storage unit interface 812. Duplicate eliminator 806 identifies whether a newly received segment has already been stored in storage units 810. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 810 that make up the file. Segments are then packed by a container manager (not shown) into one or more storage containers stored in storage units 810. The deduplicated segments may be further compressed using a variation of compression algorithms, such as a Lempel-Ziv algorithm before being stored.

When a file is to be retrieved (for storage application 814 for example), file service interface 802 is configured to communicate with file system control 808 to identify appropriate segments stored in storage units 810 via storage unit interface 812. Storage unit interface 812 may be implemented as part of a container manager. File system control 808 communicates with an index (not shown) to locate appropriate segments stored in storage units via storage unit interface 812. Appropriate segments are retrieved from the associated containers via the container manager and are used to construct the requested file. The file is provided via interface 802 in response to the request. In one embodiment, file system control 808 utilizes a tree (e.g., a segment tree) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   detecting a small computer system interface (SCSI) command failed by a target input and output (IO) interface at a SCSI target, wherein the SCSI target is communicatively coupled with a SCSI initiator through a set of communication links, wherein the failed SCSI command is sent from the SCSI initiator;
   withholding by a target processor returning a response for the failed SCSI command to the SCSI initiator;
   checking by a linker checker a status of the set of communication links periodically within a withholding duration while the response for the failed SCSI command is withheld, wherein the checking is performed at a periodical interval duration, the interval duration is less than the withholding duration, and both the withholding duration and the interval duration are configurable by a system operator; and
   returning by the target processor the response for the failed SCSI command to the SCSI initiator upon at least one of two conditions is met:
   the withholding duration expires; or
   the set of communication links is determined to function normally based on checking the status of the set of communication links,
   wherein the SCSI initiator does not retry the SCSI command without receiving the response of the SCSI command from the SCSI target according to a SCSI specification.

2. The computer-implemented method of claim 1, wherein checking the status of the set of communication links starts from detecting the failed SCSI command, and wherein an interval of checking is smaller than the withholding duration.

3. The computer-implemented method of claim 1, wherein the response of the failed SCSI command to the SCSI initiator is a status message with a check condition code meaning retry.

4. The computer-implemented method of claim 1, wherein the SCSI initiator resends the failed SCSI command to the SCSI target after receiving the response of the failed SCSI command, wherein the response is a status message with a check condition code meaning retry.

5. The computer-implemented method of claim 1, wherein the SCSI initiator maintains a counter to count how many times the failed SCSI command has been sent to the SCSI target, and wherein the SCSI initiator stops resending the failed SCSI command to the SCSI target after the counter reaches a resending threshold.

6. The method of claim 1, wherein the withholding duration is user configurable.

7. The method of claim 1, wherein the SCSI initiator and the SCSI target are part of a deduplicating storage system, and wherein data in the SCSI initiator is backed up at the SCSI target.

8. The method of claim 1, wherein the SCSI command is transmitted between the SCSI initiator and the SCSI target in compliance with an implementation of a fiber channel over Transmission Control Protocol/Internet Protocol (TCP/IP) (FCIP).

9. A non-transitory computer-readable storage medium having instructions stored therein, which when executed by a processor, cause the processor to perform operations, the operations comprising:
   detecting a small computer system interface (SCSI) command failed at a SCSI target, wherein the SCSI target is communicatively coupled with a SCSI initiator through a set of communication links, wherein the failed SCSI command is sent from the SCSI initiator;
   withholding returning a response for the failed SCSI command to the SCSI initiator;
   checking a status of the set of communication links periodically within a withholding duration while the response for the failed SCSI command is withheld, wherein the checking is performed at a periodical interval duration, the interval duration is less than the withholding duration, and both the withholding duration and the interval duration are configurable by a system operator; and
   returning the response for the failed SCSI command to the SCSI initiator upon at least one of two conditions is met:
   the withholding duration expires; or
   the set of communication links is determined to function normally based on checking the status of the set of communication links, wherein the SCSI initiator does not retry the SCISI command without receiving the response of the SCSI command from the SCSI target according to a SCSI specification.

10. The non-transitory computer-readable storage medium of claim 9, wherein checking the status of the set of communication links starts from detecting the failed SCSI command, and wherein an interval of checking is smaller than the withholding duration.

11. The non-transitory computer-readable storage medium of claim 9, wherein the response of the failed SCSI command to the SCSI initiator is a status message with a check condition code meaning retry.

12. The non-transitory computer-readable storage medium of claim 9, wherein the SCSI initiator resends the failed SCSI command to the SCSI target after receiving the response of the failed SCSI command, wherein the response is a status message with a check condition code meaning retry.

13. The non-transitory computer-readable storage medium of claim 9, wherein the SCSI initiator maintains a counter to count how many times the failed SCSI command has been sent to the SCSI target, and wherein the SCSI initiator stops resending the failed SCSI command to the SCSI target after the counter reaches a resending threshold.

14. The non-transitory computer-readable storage medium of claim 9, wherein the SCSI initiator and the SCSI target are part of a deduplicating storage system, and wherein data in the SCSI initiator is backed up at the SCSI target.

15. A small computer system interface (SCSI) target, wherein the SCSI target is communicatively coupled with a SCSI initiator through a set of communication links, comprising:
   a target input/output (I/O) interface configured to detect that a SCSI command failed, wherein the failed SCSI command is sent from the SCSI initiator;
   a link status checker configured to check statuses of the set of communication links periodically within a withholding duration, wherein the checking is performed at a periodical interval duration, the interval duration is less than the withholding duration, and both the withholding duration and the interval duration are configurable by a system operator; and
   a target processor configured to withhold returning a response for the failed SCSI command to the SCSI initiator after the target I/O interface detects that the SCSI command failed;
   the target processor further configured to return the response for the failed SCSI command to the SCSI initiator upon at least one of two conditions is met:
      the withholding duration expires; or
      the set of communication links is determined to function normally based on checking the status of the set of communication links,
      wherein the SCSI initiator does not retry the SCSI command without receiving the response of the SCSI command from the SCSI target according to a SCSI specification.

16. The SCSI target of claim 15, wherein the link status checker checking statuses of the set of communication links at an interval smaller than the withholding duration.

17. The SCSI target of claim 15, wherein the response for the failed SCSI command to the SCSI initiator is a status message with a check condition code meaning retry.

18. The SCSI target of claim 15, wherein the SCSI initiator resends the failed SCSI command to the SCSI target after receiving the response of the failed SCSI command, wherein the response is a status message with a check condition code meaning retry.

19. The SCSI target of claim 15, wherein the withholding duration is user configurable.

20. The SCSI target of claim 15, wherein the SCSI initiator and the SCSI target are part of a deduplicating storage system, and wherein data in the SCSI initiator is backed up at the SCSI target.

* * * * *